(12) United States Patent
Zancho et al.

(10) Patent No.: US 8,873,504 B2
(45) Date of Patent: Oct. 28, 2014

(54) FLEXIBLE LOW COMPLEXITY REFERENCE SIGNAL FILTERING FOR LTE RECEIVERS

(75) Inventors: Bryan W. Zancho, McHenry, IL (US); Thomas P. Krauss, Algonquin, IL (US); Bryan S. Nollett, Fox River Grove, IL (US); David L. Steckl, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 240 days.

(21) Appl. No.: 13/597,819

(22) Filed: Aug. 29, 2012

(65) Prior Publication Data

US 2014/0064238 A1    Mar. 6, 2014

(51) Int. Cl.
*H04L 5/22* (2006.01)

(52) U.S. Cl.
USPC .......................... 370/330; 370/252; 370/232

(58) Field of Classification Search
CPC . H04W 72/08; H04W 72/0446; H04W 88/08; H04W 72/0453
See application file for complete search history.

(56) References Cited

U.S. PATENT DOCUMENTS

| | | | |
|---|---|---|---|
| 7,428,262 B2 | 9/2008 | Zancho et al. | |
| 7,995,648 B2 | 8/2011 | Xia et al. | |
| 8,472,399 B2 * | 6/2013 | Novak et al. | 370/330 |
| 2006/0182063 A1 * | 8/2006 | Ma et al. | 370/331 |
| 2006/0227886 A1 * | 10/2006 | Li et al. | 375/260 |
| 2009/0285276 A1 * | 11/2009 | Heikkila | 375/232 |
| 2012/0147761 A1 * | 6/2012 | Zhang et al. | 370/252 |
| 2013/0163537 A1 * | 6/2013 | Anderson et al. | 370/329 |

* cited by examiner

*Primary Examiner* — Un C Cho
*Assistant Examiner* — M Mostazir Rahman
(74) *Attorney, Agent, or Firm* — Faegre Baker Daniels LLP

(57) ABSTRACT

A method and system generates channel response estimates by performing time direction filtering of first channel estimates obtained from frequency direction filtering. A baseband integrated circuit (BBIC) receives information signals comprising reference signals, control signals provided by physical control channels, and data signals provided by physical data channels. Using a latency requirement of a physical channel, symbol selection logic selects valid reference signal symbol positions corresponding to first channel estimates from among frequency filtered received reference signals. A coefficient set selection logic selects a set of filter coefficients from among multiple sets of pre-optimized coefficients, utilizing at least one of (a) the latency requirement, (b) a channel condition, and (c) the selected reference signal symbol positions. A time direction filter uses the selected filter coefficients to filter the first channel estimates in order to generate a channel response estimate for a resource element of the physical channel.

20 Claims, 7 Drawing Sheets

| Target sub-carrier "k" and symbol number "l" | Physical channel type | Latency requirement level | Valid reference symbol positions | SNR | Doppler effect | Coefficient set |
|---|---|---|---|---|---|---|
| (a, d) | control | low | [-14,-10,-7,-3, 0] | range 3 | Level 2 | 1 |
| (a, d) | control | low | [-14, 0] | range 2 | Level 4 | 3 |
| (b, c) | data | high | [0, 4, 7, 11, 14] | range 2 | Level 1 | 8 |
| (b, e) | data | high | [0, 4, 7] | range 1 | Level 2 | 6 |
| ⋮ | | | | | | |

502
504
506
508

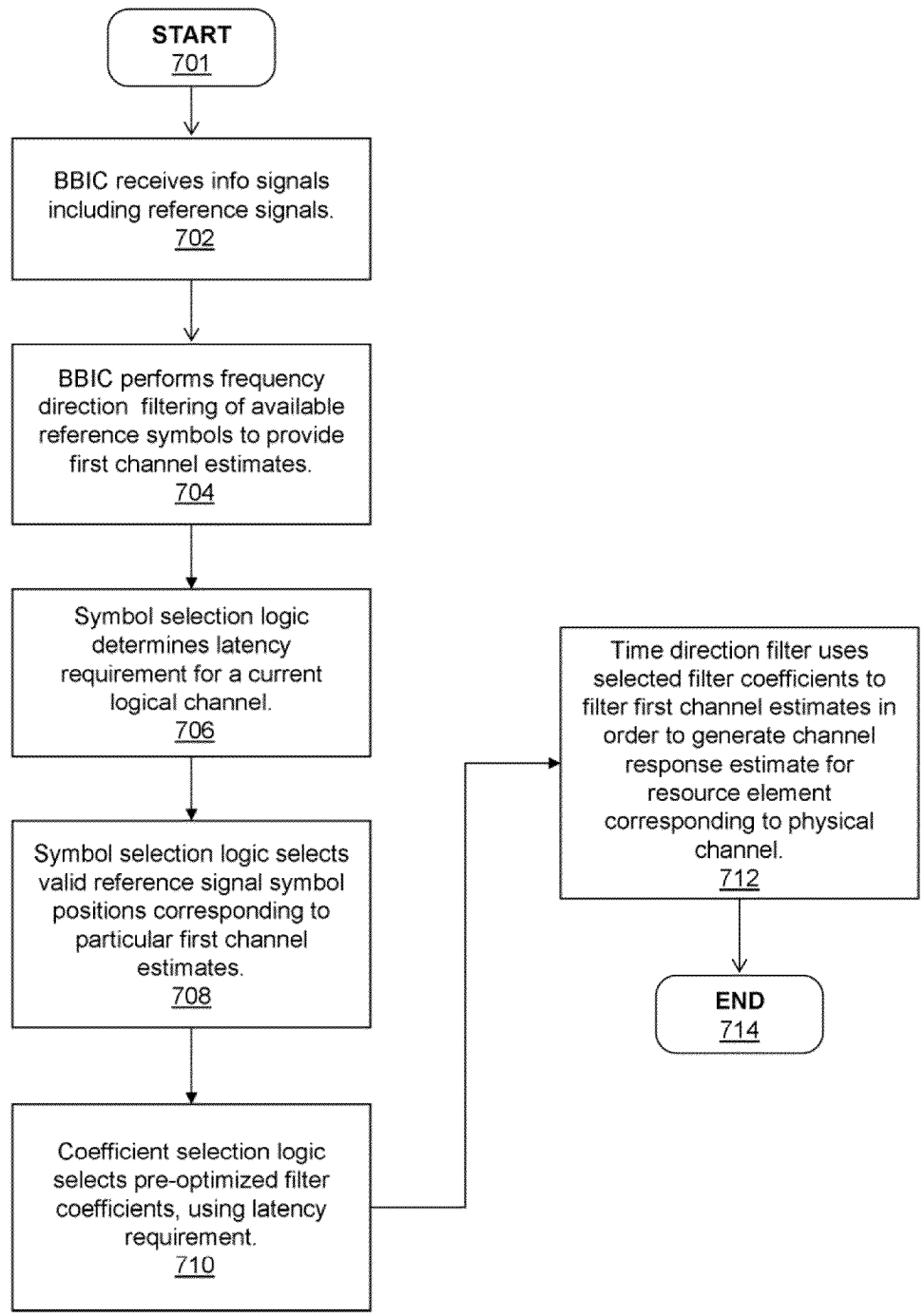

us 8,873,504 B2

FLEXIBLE LOW COMPLEXITY REFERENCE SIGNAL FILTERING FOR LTE RECEIVERS

BACKGROUND

1. Technical Field

The present disclosure relates in general to wireless communication devices and in particular to channel estimation in wireless communication devices.

2. Description of the Related Art

In the LTE specification, the transmitted signal is described by a resource grid, which has frequency on one axis and time on the other axis. Each element of the grid can be identified by subcarrier number in the frequency direction, and symbol number in the time direction. In a normal sub-frame, the reference signal is transmitted on a semi-regularly distributed subset of the grid. These reference signals are filtered to create channel estimates for the data elements of the resource grid. The reference signals are spread out in time and frequency, but only occupy some of the symbols in the grid. Furthermore, in the LTE standard, not all sub-frames are normal.

The number and position of symbols that contain reference signals varies. In particular, the number and position of symbols that contain reference signals depends on whether the received sub-frame is a multicast-broadcast single frequency network (MBSFN) sub-frame or a special time division duplex (TDD) sub-frame. In addition, the presence of measurement gaps, during which reference signals are not available, increases the difficulty in determining reliable channel estimates. Conventionally, various types of filters are applied to reference signals in order to obtain channel response estimates.

One method for filtering the reference signals is to first filter in the frequency direction to obtain initial channel estimates. Then, using the initial channel estimates, a second filtering operation is done in the time direction. However, in some cases, initial channel estimates are only available for the ends of the time direction filter with no initial channel estimates available for the middle. In other cases initial channel estimates are available only for the middle of the time direction filter. Another challenge involves a generation and selection of filter coefficients that account for channel conditions, such as Doppler rate. A further challenge involves generation and selection of coefficients that account for the latency requirement of the physical channel for which channel estimates are being calculated.

BRIEF DESCRIPTION OF THE DRAWINGS

The described embodiments are to be read in conjunction with the accompanying drawings, wherein:

FIG. 5 is table of valid reference signal symbol positions and corresponding sets of filter coefficients, according to one embodiment;

FIG. 7 is a flow chart illustrating one embodiment of a method for generating channel response estimates by performing time direction filtering of first channel estimates obtained from frequency direction filtering, according to one embodiment.

DETAILED DESCRIPTION

Figure 1:
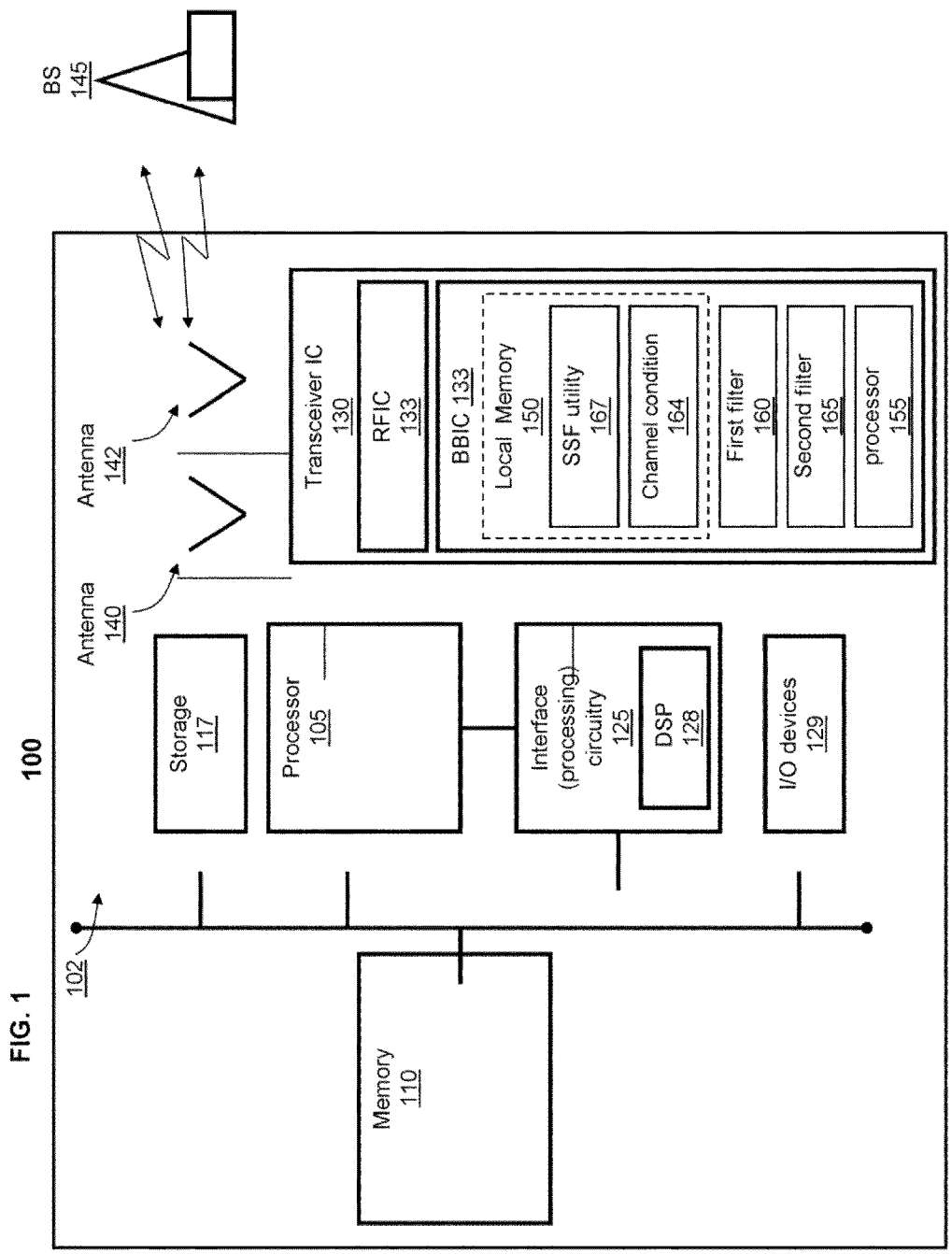
FIG. 1 is a block diagram illustrating an example wireless communication device within which the various features of the described embodiments can be advantageously implemented, according to one embodiment.

The illustrative embodiments provide a method and system for generating channel response estimates by performing time direction filtering of first channel estimates obtained from frequency direction filtering. A baseband integrated circuit (BBIC) receives information signals comprising reference signals, control signals provided by physical control channels, and data signals provided by physical data channels. The information signals correspond to transmission signals indexed by sub-carrier number and symbol number at a base-station using a resource grid, which has a frequency direction and a time direction. The reference signals are first filtered in the frequency direction to obtain an initial channel estimate at each subcarrier of the symbols that contain reference signals. Using a latency requirement of a physical channel, symbol selection logic selects valid reference signal symbol positions corresponding to first channel estimates from among the frequency filtered received reference signals. A coefficient set selection logic selects a set of filter coefficients from among multiple sets of pre-optimized coefficients, utilizing at least one of (a) the latency requirement, (b) a channel condition, and (c) the selected reference signal symbol positions. A time direction filter uses the selected filter coefficients to filter the first channel estimates in order to generate a channel response estimate for a resource element within the physical channel. The various aspects of the method are described below with reference to the figures and in particular with reference to the flow charts of FIGS. 6 and 7.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

With specific reference now to FIG. 1, there is depicted a block diagram of an example wireless communication device 100, within which the functional aspects of the described embodiments may advantageously be implemented. Wireless communication device 100 represents a device that is adapted to transmit and receive electromagnetic signals over an air interface via uplink and/or downlink channels between the wireless communication device 100 communication network equipment (e.g., base-station 145) utilizing at least one of a plurality of different communication standards including Long Term Evolution (LTE), Global System for Mobile Communications (GSM) and Code Division Multiple Access (CDMA). In one or more embodiments, the wireless communication device can be a mobile cellular device/phone or smartphone, or laptop, netbook or tablet computing device, or other types of communications devices. Wireless communication device 100 comprises processor 105 and interface circuitry 125, which includes digital signal processor (DSP) 128. Processor 105 and interface circuitry 125 are connected to memory component 110 and one or more I/O devices 129 via signal bus 102. Wireless communication device 100 includes a transceiver integrated circuit 130 for sending and receiving communication signals. In at least some embodiments, the sending and receiving of communication signals occur wirelessly and are facilitated by one or more antennas 140 and 142 coupled to the transceiver IC 130. The number of antennas can vary from device to device, ranging from a single antenna to two or more antennas, and the presentation within wireless communication device 100 of two antennas is merely for illustration. Wireless communication device 100 is able to wirelessly communicate to base-station 145 via antenna 140 and antenna 142.

Base station 145 can be any one of a number of different types of network stations and/or antenna associated with the infrastructure of the wireless network, and configured to support uplink and downlink communication via one or more of the wireless communication protocols, as known by those skilled in the art.

Transceiver IC 130 comprises baseband integrated circuit (BBIC) 133 and radio frequency integrated circuit (RFIC) 132. BBIC 133 comprises a first filter 160 (e.g., a frequency direction filter) and a second filter 165 (e.g., a time direction filter). In one embodiment, BBIC 133 comprises a local processor 155, which can be described as a digital signal processor (DSP), and a local memory 150 or storage system. According to one aspect of the disclosure, the local memory/storage system 150 includes therein firmware, such as symbol selection and filtering (SSF) utility 167, which supports the various processing functions of BBIC 133. The structural makeup of BBIC 133 is described in greater detail in FIG. 2.

In addition to the above described hardware components of wireless communication device 100, various features of the invention may be completed/supported via software (or firmware) code and/or logic stored within memory 110 (or other storage 117) or local memory 150 of BBIC 133 and executed by one of DSP 128, processor 105, and a local processor 155 of BBIC 133. Thus, for example, illustrated within local memory 150 are a number of software/firmware/logic components/modules, including SSF utility 167.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Figure 2:
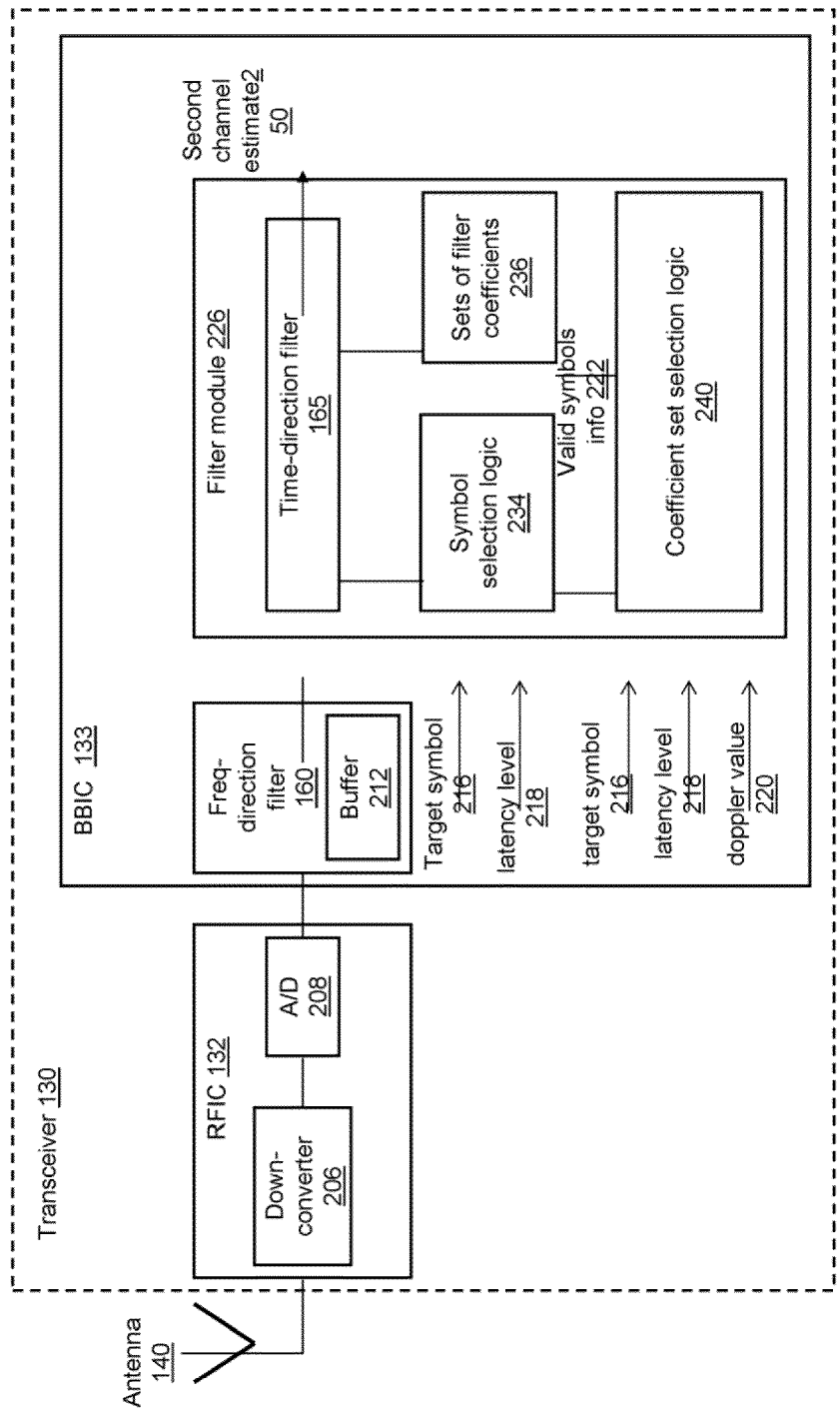
FIG. 2 provides a block diagram representation of a baseband integrated circuit (BBIC), according to one embodiment.
Figure 3:
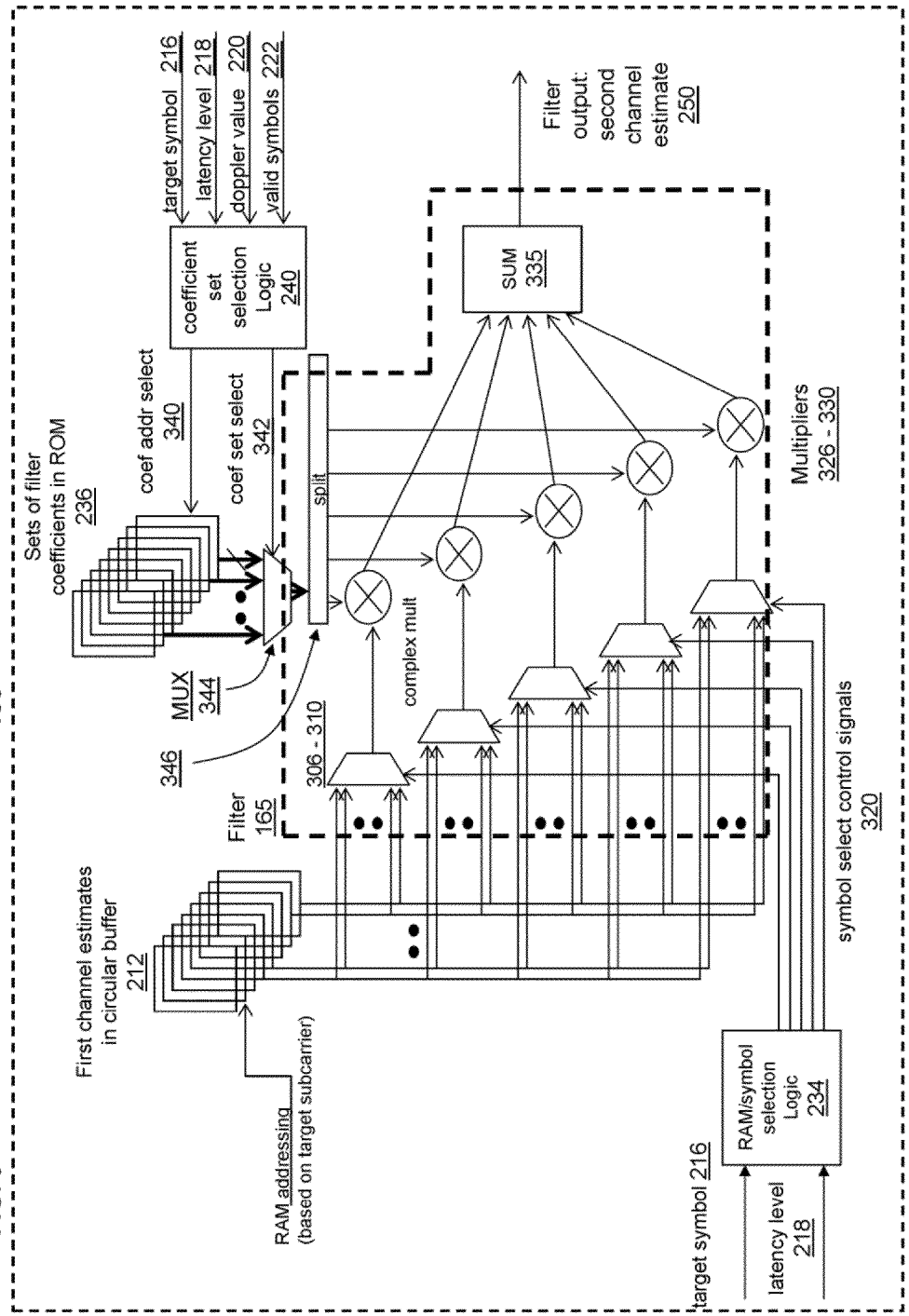
FIG. 3 provides a block diagram representation of a BBIC having a time direction filter, according to one embodiment.

FIG. 2 provides a block diagram representation of a transceiver having a baseband integrated circuit BBIC, according to one embodiment. Transceiver 130 comprises RFIC 132 connected to antenna 140, and BBIC 133. Illustrated within an RF processing chain of RFIC 132 is down-converter 206 and analog to digital (A/D) converter 208. BBIC 133 comprises frequency direction filter 160, which comprises buffer 212. In addition, BBIC 133 comprises filter module 226 coupled to an output of frequency direction filter 160. Filter module 226 comprises time-direction filter 165. In one embodiment, time-direction filter 165 comprises hardware that can be used to implement various filter related functions including arithmetic functions directly associated with filtering. For example, as illustrated in FIG. 3, time direction filter 165 includes at least one multiplexer (e.g., MUX 306-310), at least one multiplier (e.g., multiplier 326-330) and at least one combiner (e.g., sum 335).

Filter module 226 also comprises symbol selection logic 234, multiple sets of filter coefficients 236, and coefficient set selection logic 240. Symbol selection logic 234 is coupled to an input port of coefficient set selection logic 240 to provide information 222 about a set of valid reference symbol positions to be utilized by time-direction filter 165 to compute channel response estimates. Coefficient set selection logic 240 is coupled to multiple sets of filter coefficients 236 to enable coefficient set selection logic 240 to identify, within multiple sets of filter coefficients 236, a particular set of coefficients that is being selected to provide time-direction filtering associated with a corresponding target symbol and target sub-carrier of an information channel. Multiple sets of filter coefficients 236 represents pre-optimized sets of filter coefficients. Symbol selection logic 234 and multiple sets of filter coefficients 236 are both coupled to time-direction filter 165.

Symbol selection logic 234 receives target symbol information 216 and latency level information 218 at a first input port and a second input port, respectively. Coefficient set selection logic 240 receives target symbol information 216, latency level information 218 and Doppler value information 220 at respective input ports. Time-direction filter 165 filters selected frequency direction filtered channel estimates, referred to as first channel estimates. Time-direction filter 165 yields second channel response estimate 250 from filtering selected first channel estimates.

Baseband integrated circuit (BBIC) 133 comprises a processing unit (e.g., processor 155) that receives information signals comprising received reference signals, previously transmitted by base-station 145 (FIG. 1), and at least one of control signals provided by physical control channels, and data signals provided by physical data channels. The information signals correspond to transmission signals indexed at base-station 145 using a resource grid having a frequency direction and a time direction. The resource grid comprises resource elements and a number of resource elements constitute a physical channel. An information signal is associated with a corresponding resource element. Within the resource grid, resource elements are identified by subcarrier number in the frequency direction and symbol number in the time direction. Within BBIC 133, frequency direction filter 160 filters received reference signals using a frequency direction of the resource grid to obtain initial channel response estimates at each subcarrier frequency for symbols containing received reference signals. For example, in one embodiment, frequency direction filter 160 is applied to received reference signals which are indexed by different respective sub-carrier numbers and a same symbol number to generate first/initial channel response estimates. Thus, from the perspective of a resource grid, frequency direction filter 160 is performed using received reference signals within a single column.

Frequency direction filter 160 stores filtered reference signals representing the first channel estimates in a circular buffer (e.g., buffer 212). Circular buffer 212 subsequently provides filtered reference signals to time-direction filter 165 to trigger filtering in the time direction. Circular buffer 212 provides filtered reference signals to time-direction filter 165 based on an at least one of: (a) an order of arrival of filtered reference signals; and (b) a time indexed position of filtered reference signals within a sub-frame. Circular buffer 212 comprises a plurality of random access memory (RAM) components which are addressable using a sub-carrier number corresponding to a stored filtered reference signal.

In addition to receiving target symbol information 216 and latency level information 218, symbol selection logic 234 receives configuration and control data, which informs symbol selection logic 234 of at least one of: (a) an availability of a sub-frame; (b) available and valid reference signal symbol positions; (c) a particular type of a selected sub-frame; and (d) sub-frame structure and dimensions. Information about the transmit antenna used at the base station is associated with the position and availability of reference signals. Cyclic prefix information is associated with sub-frame structure and dimensions. Symbol selection logic 234 selects, from among the available and valid reference signal symbol positions, an appropriate set of reference signal symbol positions that time-direction filter 165 is able to use to provide a second channel response estimate associated with a target symbol of a corresponding resource element. Symbol selection logic 234 selects the appropriate set of reference signal symbol positions based on a latency requirement level of the corresponding physical channel and on an availability of at least one of: (a) a current sub-frame; (b) a previous sub-frame; and (c) a next sub-frame. The latency requirement level is dependent upon a type of information channel for which time-direction filter 165 determines a second channel estimate. For example, in one embodiment, BBIC 133 assigns a low latency requirement level to a physical control channel, and a high latency requirement level to a physical data channel. An example decision tree that illustrates an algorithm that symbol selection logic 234 uses to select symbol positions, based on latency requirement level and availability of sub-frames, is described in FIG. 6. Symbol selection logic 234 provides information about the selected symbol positions to coefficient set selection logic 240 to enable coefficient set selection logic 240 to select an appropriate set of filter coefficients that time-direction filter 165 applies to selected first channel estimates corresponding to the selected symbol positions.

Coefficient set selection logic 240 selects the appropriate set of filter coefficients by utilizing at least one of: (a) the latency requirement, (b) a channel condition such as a Doppler value, (c) the selected reference signal symbol positions provided by symbol selection logic 234, and (d) the target symbol information for a corresponding resource element. Multiple sets of filter coefficients 236 comprise pre-optimized sets of filter coefficients that are stored in look up tables for various arrangements of available reference signal symbol positions that can be configured based on specifications of a corresponding wireless communication standard (e.g., Long Term Evolution (LTE) specifications). In one embodiment, coefficients for invalid reference symbol positions are mapped to zero values. For each configurable arrangement of available reference signal symbol positions, multiple sets of filter coefficients are stored. Each of the multiple sets of filter coefficients corresponding to a particular arrangement of available/valid reference signal symbol positions is optimized for a particular channel condition and for specific latency requirements.

Time-direction filter 165 filters the selected first channel estimates in the time direction by performing a complex multiplication of the first channel estimates by a selected set of pre-optimized filter coefficients in order to compute a second channel response estimate 250 for a resource element within a particular physical data channel or physical control channel. Time-direction filter 165 is further described in the example implementation of a time direction filter provided in FIG. 3.

FIG. 3 provides a block diagram representation of a BBIC having a time direction filter, according to one embodiment. BBIC 133 comprises circular buffer 212 which comprises the first channel estimates obtained from frequency direction filter 160 (FIG. 2). BBIC 133 also comprises symbol selection logic 234, sets of filter coefficients 236 for time-direction frequency filtering, and coefficient set selection logic 240. BBIC 133 also includes time-direction filter 165.

In the example implementation of FIG. 3, time-direction filter 165 is implemented as a five (5) tap time-direction filter. In order to provide the 5-tap time-direction filter, time-direction filter 165 includes five (5) multiplexers (MUXs) 306-310 and five corresponding multipliers 316-320. As described in FIG. 2, coefficient set selection logic 240 selects a particular set of five filter coefficients from among multiple sets of filter coefficients 236 stored in memory. In this example implementation, there is a separate ROM for each possible combination of latency level, Doppler value, and valid reference signal symbol scenario. The selection of a set of five filter coefficients is executed in two steps. In particular, coefficient set selection logic 240 uses coefficient address select signal 340 as the address input to each memory, such as read only memory (ROM), to select the coefficients for a particular target symbol. A set of five filter coefficients from each ROM is provided as input to MUX 344. In the example implementation of FIG. 3, coefficient set selection logic 240 provides a coefficient set selection signal 342 that selects, based on latency level, Doppler value, and valid reference signal symbol scenario, a set of filter coefficients that are propagated to the output port of MUX 344. Filter 165 uses splitter 346 to propagate coefficients for the valid reference signal symbol positions to an input port of a particular complex multiplier. Splitter 346 provides a zero value to an input port of a complex multiplier corresponding to an invalid reference signal symbol position.

Each multiplexer from among MUXs 306-310 has N input ports to receive currently available first channel estimates. Symbol selection logic 234 provides a respective selection signal to each of the five MUXs 306-310 to select a particular first channel estimate to propagate to an output port of a corresponding multiplexer. Symbol selection logic 234 provides selection signals to propagate, to an output port of a corresponding MUX, a specific set of first channel estimates. These first channel estimates correspond to reference signal symbol positions that symbol selection logic 234 selects based on latency requirement level and availability of sub-frames. As described in FIG. 2, symbol selection logic 234 provides information about the selected symbol positions to coefficient set selection logic 240 to enable coefficient set selection logic to select the appropriate set of coefficients for the first channel estimates corresponding to the selected symbol positions.

Time-direction filter 165 filters the selected first channel estimates in the time direction by performing a complex multiplication of the first channel estimates by a selected set of pre-optimized filter coefficients. A result of each of the complex multiply operations is received at a respective input port of adder/"sum" 335. Adder 335 combines the results from the complex multiply operations in order to provide the second channel response estimate 250 for a particular physical data channel or physical control channel.

Figure 4:
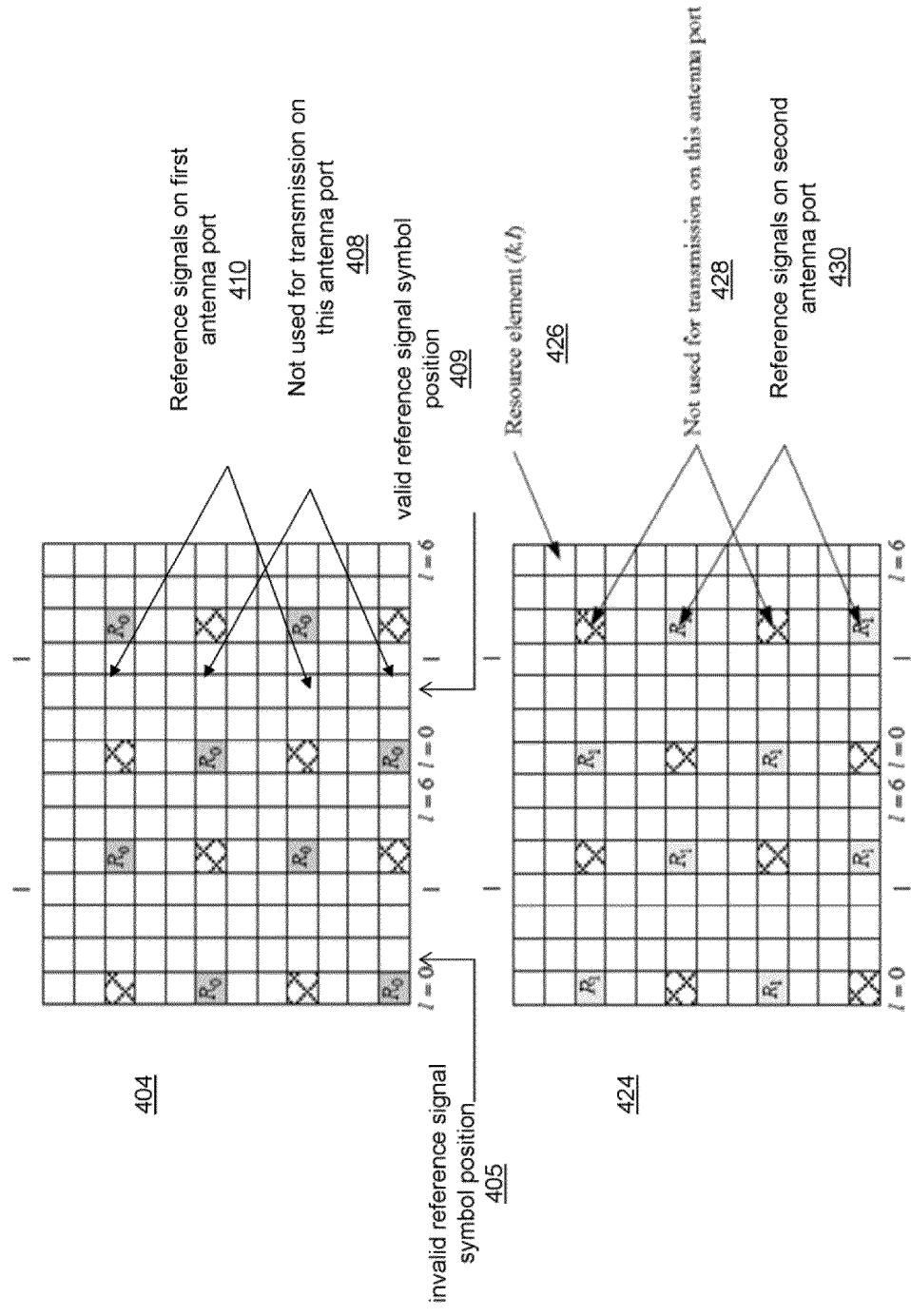
FIG. 4 illustrates a pair of resource grids depicting transmitted reference signals corresponding to a pair of transmit antennas propagating information signals from the base-station, according to one embodiment.

FIG. 4 illustrates a pair of resource grids depicting transmitted reference signals corresponding to a pair of transmit antennas propagating information signals from the base-station, according to one embodiment. Grids 400 comprises first grid 404 corresponding to signal propagation using a first antenna, and second grid 424 corresponding to signal propagation using a second antenna. Based on a perspective of signal transmission from the base-station, first grid 404 and second grid 424 comprise a number of resource elements that contain reference signals, respectively. Each resource element (e.g., resource element 426) is identified by sub-carrier number "k" and symbol number "1". Illustrated within first grid 404 are a number of reference signals $R_0$ which are indicated as reference signals 410. Reference symbols $R_0$ are transmitted by a first transmitter port at base-station 145. The symbol indices providing reference signals are referred to herein as valid reference signal symbol positions and are illustrated as valid reference signal symbol position 409. The symbol indices not providing reference signals are referred to herein as invalid reference signal symbol positions and are illustrated as invalid reference signal symbol position 405. In first grid 404, resource elements which do not provide received reference signals are illustrated as "not used for transmission on this antenna port" 408.

Similarly, illustrated within second grid 424 are a number of reference signals $R_1$ which are indicated as reference signals 430. Reference signals $R_1$ are transmitted by a second transmitter port at base-station 145. However, second grid 424 comprises a number of resource elements that do not contain reference signals. These resource elements which do not provide reference signals are illustrated as "not used for transmission on this antenna port" 428.

First grid 404 and second grid 424 demonstrate differences in resource elements which do not provide received reference signals. These differences result from different transmit antennas being utilized at base-station 145. One difference is clearly illustrated by the fact that, in first grid 404, reference signals 410 which correspond to resource elements used for transmission of reference signals on the first antenna port correspond to resource element locations of resource elements which are "not used for transmission [of reference signals] on this [second] antenna port" 428 in second grid 424.

FIG. 5 is a table of valid reference signal symbol positions and corresponding sets of filter coefficients, according to one embodiment. For each resource element which is illustrated in a first column of Table 500, Table 500 provides a corresponding type of physical channel associated with the resource element, which type is illustrated in the second column of Table 500. In addition, Table 500 provides a latency requirement level which is illustrated in the third column of Table 500. Furthermore, a corresponding set of valid reference signal symbol positions is illustrated in a fourth column of Table 500. The fifth and sixth columns, respectively, provide the corresponding channel conditions (e.g., signal to noise ratio (SNR)) and the Doppler value associated with a propagation channel between a mobile unit and a base station. The seventh column provides the selected set of filter coefficients.

In order to perform time-direction filtering, coefficient set selection logic 240 identifies, for each resource element, a corresponding set of pre-optimized filter coefficients to be used to compute second channel response estimates. The set of pre-optimized filter coefficients are identified utilizing at least one of: (a) the latency requirement, (b) a channel condition such as a Doppler value, (c) the selected reference signal symbol positions provided by symbol selection logic 234, and (d) the target symbol information for a corresponding resource element. Coefficient set selection logic 240 retrieves information from a stored data structure (e.g., Table 500) of pre-computed filter coefficients for a fixed length finite impulse response (FIR) filter. The stored data structure comprises multiple sets of coefficients for each of a plurality of arrangements of reference signal symbol positions in the resource grid. The multiple sets of coefficients are pre-optimized for various channel conditions and latency requirements.

Referring specifically to Table 500, first row 502 of Table 500 shows that resource element "(a, d)" is a component of a physical control channel and has a "low" latency requirement level, and the set of valid reference signal symbol positions is provided by "[−14, −10, −7, −3, 0]". Channel SNR is determined to be in "range 3" and the Doppler effect is measured at "Level 2". In addition, first row 502 indicates that set "1" is the selected set of filter coefficients that corresponds to resource element (a, d) having the low latency requirement level. Second row 504 is associated with the same resource element (a, d) which has the low latency requirement level. However, unlike first row 502, second row 504 illustrates that the set of valid reference signal symbol positions as "[−14, 0]". Channel SNR is determined to be in "range 2" the Doppler effect is measured at "Level 4". In this case, set "3" is the selected set of filter coefficients that corresponds to resource element (a, d).

Third row 506 shows that resource element "(b, c)" is associated with a physical data channel having a "high" latency requirement level, and the set of valid reference signal symbol positions is provided by "[0, 4, 7, 11, 14]". Channel SNR is determined to be in "range 2" and the Doppler effect is measured at "Level 1". In addition, third row 506 indicates that set "8" is the selected set of filter coefficients that corresponds to resource element (b, c) having the high latency requirement level. Fourth row 508 provides information for another resource element (i.e., "(b, e)"), which is associated with a physical data channel, and is presented in a similar manner to the presentation in third row 506.

Figure 6:
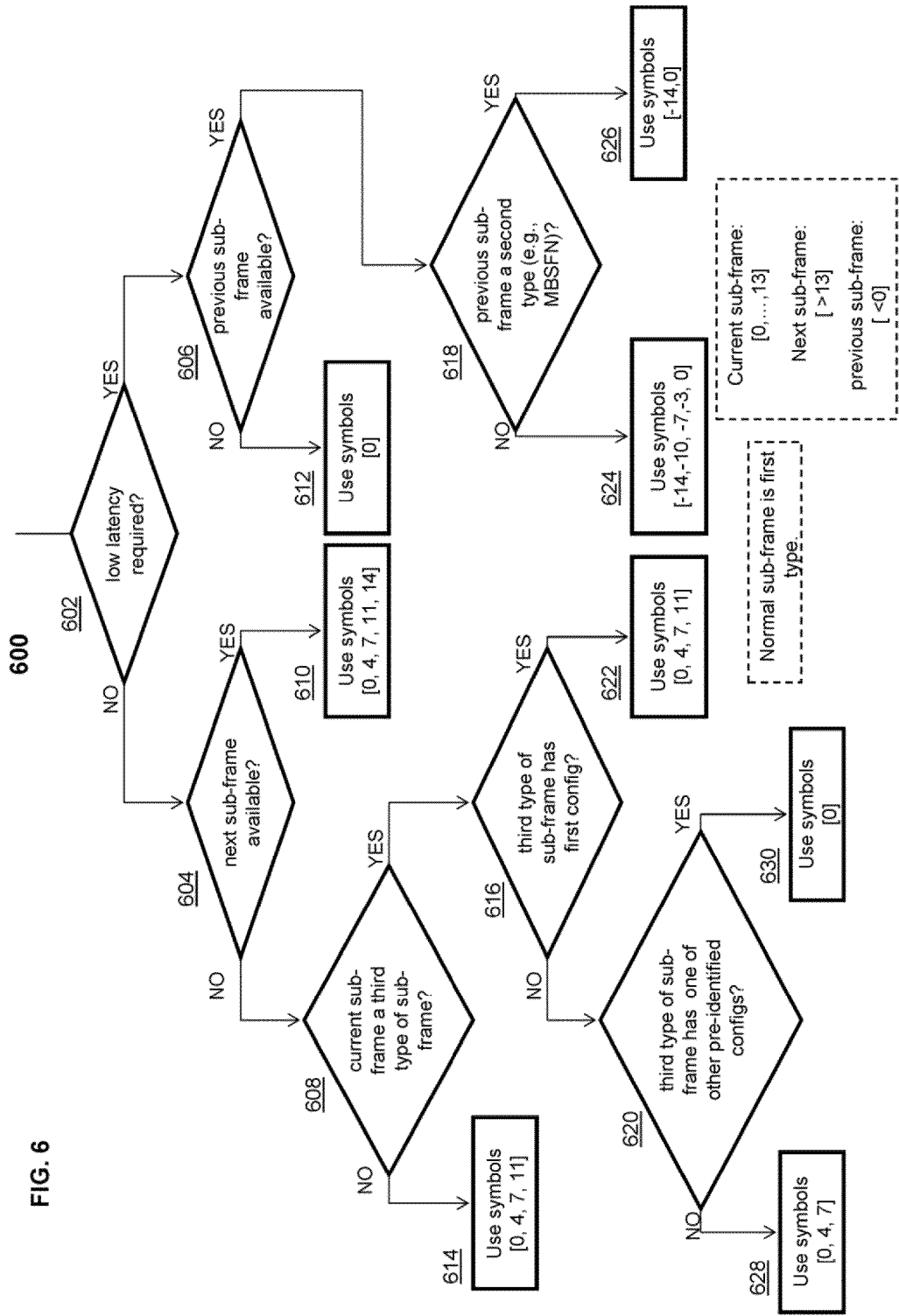
FIG. 6 is a flow chart illustrating one embodiment of a method for determining valid reference signal symbol positions based on latency requirement and availability of sub-frames, according to one embodiment.

FIGS. 6 and 7 are flow charts illustrating methods by which the above processes of the illustrative embodiments can be implemented. Specifically, FIG. 6 illustrates one embodiment of a method for determining valid reference signal symbol positions based on latency requirement and availability of sub-frames, according to one embodiment. FIG. 7 illustrates a method for generating channel response estimates by performing time-direction filtering of first channel estimates obtained from frequency direction filtering, according to one embodiment. Although the methods illustrated by FIGS. 6 and 7 may be described with reference to components and functionality illustrated by and described in reference to FIGS. 1-5, it should be understood that this is merely for convenience and alternative components and/or configurations thereof can be employed when implementing the method. Certain portions of the methods may be completed by SSF utility 167 executing on one or more processors (processor 105 or DSP 128) within wireless communication device 100 (FIG. 1), or local processor 155 or controller of BBIC 133 (FIGS. 1 and 2). The executed processes then control specific operations of or on BBIC 133. For simplicity is describing the methods, all method processes are described from the perspective of BBIC 133 and specifically filter module 226.

In the described implementation, a current sub-frame includes symbols having symbol numbers within a range of 0 to 13. A next sub-frame includes symbols having symbol numbers larger than 13. A previous sub-frame includes symbols having symbol numbers less than 0. The method of FIG. 6 begins at decision block 602 at which symbol selection logic 234 determines whether the latency requirement level of a physical channel is low or high. In response to the latency requirement being low relative to a pre-set threshold latency, symbol selection logic 234 determines whether a previous sub-frame is available (decision block 606). In response to determining that the previous sub-frame is not available, symbol selection logic 234 identifies, at block 612, at least one symbol that contains a received reference signal within a current sub-frame to be used in generating a second channel response estimate. In one embodiment, the current sub-frame is a first type of sub-frame that is a normal sub-frame. However, in response to determining that the previous sub-frame is available, symbol selection logic 234 determines whether the previous sub-frame is a second type of sub-frame that provides a corresponding arrangement of available reference signal symbol positions, as shown at decision block 618. For example, in one implementation, the second type of sub-frame is an MBSFN sub-frame. In response to determining that the previous sub-frame is the second type of sub-frame with the corresponding arrangement of available reference signal symbol positions, symbol selection logic 234 identifies, at block 626, at least one symbol having a corresponding reference signal from each of: (a) reference signals within the second type of sub-frame, and (b) other reference signals within a current sub-frame, in order to utilize the at least one corresponding initial channel response estimates from among the filtered available reference signal to generate the second channel response estimate. In response to determining that the previous sub-frame is not the second type of sub-frame, symbol selection logic 234 identifies, at block 624, at least one symbol having a corresponding reference signal from each of: (a) reference signals within the previous sub-frame, and (b) other reference signals within a current sub-frame, in order to utilize the at least one corresponding initial channel response estimate from among the filtered available reference signals to generate the second channel response estimate. A particular type of sub-frame differs from another type of sub-frame based on at least one of: (a) transmission schedule of reference signals, and (b) the arrangement and position of reference signals within the resource grid.

Referring again to decision block 602, in response to determining that the latency requirement is high relative to the pre-set threshold latency, symbol selection logic 234 determines, at decision block 604, whether a next sub-frame is available. In response to determining that the next sub-frame is available, symbol selection logic 234 identifies, at block 610, symbols which contain: (a) a first number of received reference signals within a current sub-frame, and (b) at least one received reference signal within a next sub-frame. The corresponding initial channel response estimates from among the filtered available received reference signals, corresponding to the identified symbols, are used to generate the second channel response estimates. In response to determining that the next sub-frame is not available, symbol selection logic 234 determines, at decision block 608, whether the current sub-frame is a third type of sub-frame having a corresponding arrangement of available reference signal symbol positions. In one implementation, the third type of sub-frame is a special time division duplex (TDD) sub-frame. In response to determining that the current sub-frame is not the third type of sub-frame, symbol selection logic 234 identifies, at block 614, at least one symbol that contains a reference signal within the current sub-frame, where a corresponding initial channel response estimates from among the filtered available reference signal is used to generate the second channel response estimate. In response to determining that the current sub-frame is the third type of sub-frame, symbol selection logic 234 determines, at decision block 616, whether the third type of sub-frame has a first configuration. In response to determining that the current sub-frame is the third type of sub-frame having a first configuration, symbol selection logic 234 identifies, at block 622, at least one symbol that contains a reference signal from within the third type of sub-frame having the first configuration, where a corresponding initial channel response estimates from among the filtered available reference signal is used to generate the second channel response estimate. In response to determining that the current sub-frame is the third type of sub-frame that does not have the first configuration, symbol selection logic 234 determines, at decision block 620, whether the third type of sub-frame has another configuration from among a number of pre-established configurations. In response to determining that the current sub-frame is the third type of sub-frame having the other configuration (e.g., a second configuration of the special TDD sub-frame) from among the number of pre-established configurations that excludes the first configuration, symbol selection logic 234 identifies, at block 630, at least one symbol that contains a reference signal from within the third type of sub-frame having the other configuration, where a corresponding initial channel response estimates from among the filtered available reference signal is used to generate the second channel response estimate. However, in response to determining that the current sub-frame is the third type of sub-frame that neither has the first configuration nor the other configuration from among the number of pre-established configurations that excludes the first configuration, symbol selection logic 234 identifies, at block 628, at least one symbol that contains a reference signal from within the third type of sub-frame that neither has the first configuration nor the other configuration, where a corresponding initial channel response estimates from among the filtered available reference signal is used to generate the second channel response estimate.

The method of FIG. 7 begins at initiator block 701 and proceeds to block 702 at which local processor 155 of BBIC 133 receives information signals including reference signals following transmission along a propagation channel. At block 704, BBIC 133 uses frequency direction filter 160 to filter available reference signals in a frequency direction of a corresponding resource grid. At block 706, symbol selection logic 234 within BBIC 133 determines a latency requirement level for a current corresponding physical channel. At block 708, symbol selection logic 234 selects, using the latency requirement level, valid reference signal symbol positions corresponding to first channel estimates from among the frequency filtered received reference signals. At block 710, coefficient set selection logic 240 selects a set of pre-optimized filter coefficients, from among multiple sets of pre-optimized coefficients, utilizing at least one of: (a) the latency requirement, (b) a channel condition, and (c) the selected valid reference signal symbol positions. At block 712, time-direction filter 165 uses the selected filter coefficients to filter the first channel estimates in order to generate a channel response estimate for a resource element associated with the physical channel. The process ends at block 714.

The flowcharts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for channel estimation in a baseband integrated circuit (BBIC), the method comprising:
   receiving information signals comprising reference signals and at least one of control signals provided by physical control channels and data signals provided by physical data channels;
   wherein the information signals correspond to resource elements indexed at a base-station using a resource grid having a frequency direction and a time direction, wherein, within the resource grid, resource elements are identified by subcarrier number in the frequency direction and symbol number in the time direction;
   determining a latency requirement for each of a physical channel having resource elements for which channel response estimates are required;
   filtering available reference signals in the frequency direction of the resource grid to obtain initial channel response estimates at each subcarrier frequency for symbols containing reference signals;
   selecting, using the latency requirement and a symbol number corresponding to each of the available reference signals, a number of initial channel response estimates from among the filtered available reference signals;
   identifying, for each resource element, a corresponding set of pre-optimized filter coefficients to be used to compute a second channel response estimate utilizing at least one of (a) the latency requirement, (b) a channel condition, and (c) an availability and position of reference signals within the resource grid; and
   filtering the number of initial channel estimates in the time direction by performing a complex multiply of the number of initial channel estimates by a corresponding set of pre-optimized filter coefficients for each resource element in order to compute the second channel response estimate.

2. The method of claim 1, wherein said determining the latency requirement further comprises:
  determining a current type of physical channel for which channel response estimates are required;
  in response to the current type of physical channel being a physical control channel, assigning a low latency to the latency requirement; and
  in response to the current type of physical channel being a physical data channel, assigning a higher latency to the latency requirement.

3. The method of claim 1 wherein said filtering reference signals further comprises:
  storing filtered reference signals in a circular buffer that subsequently provides filtered reference signals for filtering in the time direction based on an at least one of: (a) an order of arrival of filtered reference signals; and (b) a time indexed position of filtered reference signals within a sub-frame; and
  wherein the circular buffer comprises a plurality of random access memory (RAM) components which are addressable using a sub-carrier number and symbol number corresponding to a stored filtered reference signal.

4. The method of claim 1, wherein said selecting further comprises:
  in response to the latency requirement being low relative to a pre-set threshold latency, determining whether a previous sub-frame is available;
  in response to determining that the previous sub-frame is not available, identifying at least one symbol which contains reference signals within a current sub-frame to be used in generating a second channel response estimate, wherein the current sub-frame is a first type of sub-frame that is a normal sub-frame;
  in response to determining that the previous sub-frame is available:
    determining whether the previous sub-frame is a second type of sub-frame that provides a corresponding arrangement of available reference signal symbol positions;
    in response to determining that the previous sub-frame is the second type of sub-frame with the corresponding arrangement of available reference signal symbol positions, identifying at least one symbol which contains reference signals from each of (a) reference signals within the second type of sub-frame and (b) other reference signals within a current sub-frame, in order to utilize the at least one identified initial channel response estimates from among the filtered available reference signals to generate the second channel response estimate; and
    in response to determining that the previous sub-frame is not the second type of sub-frame, identifying at least one symbol which contains reference signals from each of (a) reference signals within the previous sub-frame and (b) other reference signals within a current sub-frame, in order to utilize the at least one identified initial channel response estimates from among the filtered available reference signals to generate the second channel response estimate; and
    wherein a particular type of sub-frame differs from another type of sub-frame based on at least one of: (a) transmission schedule of reference signals; and (b) arrangement and position of reference signals within the resource grid.

5. The method of claim 1, wherein said selecting further comprises:
  in response to determining that the latency requirement is high relative to the pre-set threshold latency, determining whether a next sub-frame is available;
  in response to determining that the next sub-frame is available, identifying (a) a first number of symbols which contain a corresponding reference signal within a current sub-frame, and (b) at least one symbol which contains a corresponding reference signal within a next sub-frame, wherein identified initial channel response estimates from among the filtered available reference signals are used to generate the second channel response estimate;
  in response to determining that the next sub-frame is not available, determining whether the current sub-frame is a third type of sub-frame having a corresponding arrangement of available reference signal symbol positions;
  in response to determining that the current sub-frame is the third type of sub-frame, identifying at least one symbol which contains a corresponding reference signal from within the third type of sub-frame, based on a particular configuration of the third type of sub-frame, wherein the at least one initial channel response estimate from among the filtered available reference signals is used to generate the second channel response estimate; and
  in response to determining that the current sub-frame is not the third type of sub-frame, identifying at least one symbol which contains a corresponding reference signal within the current sub-frame wherein the at least one initial channel response estimate from among the filtered available reference signals is used to generate the second channel response estimate; and
  wherein a particular type of sub-frame differs from another type of sub-frame based on at least one of: (a) transmission schedule of reference signals; and (b) arrangement and position of reference signals within the resource grid.

6. The method of claim 1, wherein said identifying further comprises:
  retrieving information from a stored data structure of pre-computed filter coefficients for a fixed length finite impulse response (FIR) filter, wherein the stored data structure comprises multiple stored sets of coefficients for each of a plurality of arrangements of possible reference signal symbol positions and availability in the resource grid; and wherein the multiple stored sets of coefficients are pre-optimized for various channel conditions and latency requirements; and
  selecting filter coefficients based on (a) channel conditions including a measured Doppler frequency shift, (b) an availability and position of symbols that contain reference signals, and (c) the latency requirement of the physical channel for which channel estimates are being calculated, wherein filter coefficients for unavailable and invalid positions are preset to zero.

7. The method of claim 1, wherein said identifying a corresponding set of pre-optimized filter coefficients further comprises:
  determining channel conditions corresponding to received information signals from measurements of at least one of: (a) a corresponding Doppler frequency shift, and (b) a corresponding signal-to-noise (SNR) ratio.

8. A baseband integrated circuit (BBIC), the BBIC comprising:
  a processing unit that receives information signals comprising reference signals and at least one of control signals provided by physical control channels and data signals provided by physical data channels, wherein the information signals correspond to resource elements indexed at a base-station using a resource grid having a frequency direction and a time direction, and wherein, within the resource grid, resource elements are identified by subcarrier number in the frequency direction and symbol number in the time direction;

a first filter that filters reference signals in the frequency direction of the resource grid to obtain initial channel response estimates at each subcarrier frequency for symbols containing reference signals;

reference signal symbol selection logic that selects, using a latency requirement and a symbol number corresponding to each of the available reference signals, a number of initial channel response estimates from among the filtered available reference signals;

a data structure comprising pre-optimized filter coefficients;

a coefficient set selection module that identifies, for each information signal, a corresponding set of pre-optimized filter coefficients to be used to compute a second channel response estimate utilizing at least one of: (a) the latency requirement, (b) a channel condition, and (c) an availability and position of reference signals within the resource grid; and a second filter that filters the number of initial channel estimates in the time direction by performing a complex multiply of the number of initial channel estimates by a corresponding set of pre-optimized filter coefficients for each resource element in order to compute the second channel response estimate.

9. The BBIC of claim 8, further comprising:

a latency requirement identification module that determines a latency requirement associated with the current physical channel having resource elements for which channel response estimates are required by:
   determining a current type of physical channel for which channel response estimates are required;
   in response to the current type of physical channel being a physical control channel, assigning a low latency to the latency requirement; and
   in response to the current type of physical channel being a physical data channel, assigning a higher latency to the latency requirement.

10. The BBIC of claim 8 wherein the first filter:

stores filtered reference signals in a circular buffer that subsequently provides filtered reference signals for filtering in the time direction based on an at least one of: (a) an order of arrival of filtered reference signals; and (b) a time indexed position of filtered reference signals within a sub-frame; and wherein the circular buffer comprises a plurality of random access memory (RAM) components which are addressable using a sub-carrier number and symbol number corresponding to a stored filtered reference signal.

11. The BBIC of claim 8, wherein the reference signal symbol selection logic:

in response to the latency requirement being low relative to a pre-set threshold latency, determines whether a previous sub-frame is available;

in response to determining that the previous sub-frame is not available, identifies at least one symbol which contains reference signals within a current sub-frame to be used in generating a second channel response estimate, wherein the current sub-frame is a first type of sub-frame that is a normal sub-frame;

in response to determining that the previous sub-frame is available:
   determines whether the previous sub-frame is a second type of sub-frame that provides a corresponding arrangement of available reference signal symbol positions;
   in response to determining that the previous sub-frame is the second type of sub-frame with the corresponding arrangement of available reference signal symbol positions, identifies at least one symbol which contains reference signals from each of (a) reference signals within the second type of sub-frame and (b) other reference signals within a current sub-frame, in order to utilize the at least one identified initial channel response estimates from among the filtered available reference signals to generate the second channel response estimate; and
   in response to determining that the previous sub-frame is not the second type of sub-frame, identifies at least one symbol which contains reference signals from each of (a) reference signals within the previous sub-frame and (b) other reference signals within a current sub-frame, in order to utilize the at least one initial channel response estimates from among the filtered available reference signals to generate the second channel response estimate; and
   wherein a particular type of sub-frame differs from another type of sub-frame based on at least one of: (a) transmission schedule of reference signals; and (b) arrangement and position of reference signals within the resource grid.

12. The BBIC of claim 8, wherein the reference signal symbol selection logic:

in response to determining that the latency requirement is high relative to the pre-set threshold latency, determines whether a next sub-frame is available;

in response to determining that the next sub-frame is available, identifies: (a) a first number of symbols which contain a corresponding reference signal within a current sub-frame, and (b) at least one symbol which contains a corresponding reference signal within a next sub-frame, wherein identified initial channel response estimates from among the filtered available reference signals are used to generate the second channel response estimate;

in response to determining that the next sub-frame is not available, determines whether the current sub-frame is a third type of sub-frame having a corresponding arrangement of available reference signal symbol positions;

in response to determining that the current sub-frame is the third type of sub-frame, identifies at least one symbol which contains a corresponding reference signal from within the third type of sub-frame, based on a particular configuration of the third type of sub-frame, wherein the at least one initial channel response estimate from among the filtered available reference signals is used to generate the second channel response estimate; and in response to determining that the current sub-frame is not the third type of sub-frame, identifies at least one symbol which contains a corresponding reference signal within the current sub-frame wherein the at least one initial channel response estimate from among the filtered available reference signals is used to generate the second channel response estimate; and wherein a particular type of sub-frame differs from another type of sub-frame based on at least one of: (a) transmission schedule of reference signals; and (b) arrangement and position of reference signals within the resource grid.

13. The BBIC of claim 8, wherein the coefficient set selection module:
retrieves information from a stored data structure of pre-computed filter coefficients for a fixed length finite impulse response (FIR) filter, wherein the stored data structure comprises multiple stored sets of coefficients for each of a plurality of arrangements of possible reference signal symbol positions and availability in the resource grid; and wherein the multiple stored sets of coefficients are pre-optimized for various channel conditions and latency requirements; and
selects filter coefficients based on: (a) channel conditions including a measured Doppler frequency shift, (b) an availability and position of symbols that contain reference signals, and (c) the latency requirement of the physical channel having resource elements for which channel estimates are being calculated, wherein filter coefficients for unavailable and invalid positions are pre-set to zero.

14. The BBIC of claim 8, wherein the coefficient set selection module identifies a corresponding set of pre-optimized filter coefficients by identifying channel conditions corresponding to received information signals from measurements of at least one of: (a) a corresponding Doppler frequency shift; and (b) a corresponding signal-to-noise (SNR) ratio.

15. A wireless communication device comprising:
a baseband integrated circuit (BBIC) having:
a processing unit that receives information signals comprising reference signals and at least one of control signals provided by physical control channels and data signals provided by physical data channels, wherein the information signals correspond to resource elements indexed at a base-station using a resource grid having a frequency direction and a time direction, and wherein, within the resource grid, resource elements are identified by subcarrier number in the frequency direction and symbol number in the time direction;
a first filter that filters reference signals in the frequency direction of the resource grid to obtain initial channel response estimates at each subcarrier frequency for symbols containing reference signals;
reference signal symbol selection logic that selects, using a latency requirement and a symbol number corresponding to each of the available reference signals, a number of initial channel response estimates from among the filtered available reference signals;
a data structure comprising pre-optimized filter coefficients;
a coefficient set selection module that identifies, for each information signal, a corresponding set of pre-optimized filter coefficients to be used to compute a second channel response estimate utilizing at least one of (a) the latency requirement, (b) a channel condition, and (c) an availability and position of reference signals within the resource grid; and
a second filter that filters the number of initial channel estimates in the time direction by performing a complex multiply of the number of initial channel estimates by a corresponding set of pre-optimized filter coefficients for each resource element in order to compute the second channel response estimate.

16. The wireless communication device of claim 15, the BMIC further comprising:

a latency requirement identification module that determines a latency requirement associated with the current physical channel for which channel response estimates are required by:
determining a current type of physical channel for which channel response estimates are required;
in response to the current type of physical channel being a physical control channel, assigning a low latency to the latency requirement; and
in response to the current type of physical channel being a physical data channel, assigning a higher latency to the latency requirement.

17. The wireless communication device of claim 15, wherein the first filter:
stores filtered reference signals in a circular buffer that subsequently provides filtered reference signals for filtering in the time direction based on an at least one of: (a) an order of arrival of filtered reference signals; and (b) a time indexed position of filtered reference signals within a sub-frame; and
wherein the circular buffer comprises a plurality of random access memory (RAM) components which are addressable using a sub-carrier number and symbol number corresponding to a stored filtered reference signal.

18. The wireless communication device of claim 15, wherein the reference signal symbol selection logic:
in response to the latency requirement being low relative to a pre-set threshold latency, determines whether a previous sub-frame is available;
in response to determining that the previous sub-frame is not available, identifies at least one symbol which contains reference signals within a current sub-frame to be used in generating a second channel response estimate, wherein the current sub-frame is a first type of sub-frame that is a normal sub-frame;
in response to determining that the previous sub-frame is available:
determines whether the previous sub-frame is a second type of sub-frame that provides a corresponding arrangement of available reference signal symbol positions;
in response to determining that the previous sub-frame is the second type of sub-frame with the corresponding arrangement of available reference signal symbol positions, identifies at least one symbol which contains reference signals from each of (a) reference signals within the second type of sub-frame and (b) other reference signals within a current sub-frame, in order to utilize the at least one identified initial channel response estimates from among the filtered available reference signals to generate the second channel response estimate; and
in response to determining that the previous sub-frame is not the second type of sub-frame, identifies at least one symbol which contains reference signals from each of (a) reference signals within the previous sub-frame and (b) other reference signals within a current sub-frame, in order to utilize the at least one initial channel response estimates from among the filtered available reference signals to generate the second channel response estimate; and
wherein a particular type of sub-frame differs from another type of sub-frame based on at least one of: (a) transmission schedule of reference signals; and (b) arrangement and position of reference signals within the resource grid.

19. The wireless communication device of claim 15, wherein the reference signal symbol selection logic:
- in response to determining that the latency requirement is high relative to the pre-set threshold latency, determines whether a next sub-frame is available;
- in response to determining that the next sub-frame is available, identifies (a) a first number of symbols which contain a corresponding reference signal within a current sub-frame, and (b) at least one symbol which contains a corresponding reference signal within a next sub-frame, wherein identified initial channel response estimates from among the filtered available reference signals are used to generate the second channel response estimate;
- in response to determining that the next sub-frame is not available, determines whether the current sub-frame is a third type of sub-frame having a corresponding arrangement of available reference signal symbol positions;
- in response to determining that the current sub-frame is the third type of sub-frame, identifies at least one symbol which contains a corresponding reference signal from within the third type of sub-frame, based on a particular configuration of the third type of sub-frame, wherein the at least one initial channel response estimate from among the filtered available reference signals is used to generate the second channel response estimate; and
- in response to determining that the current sub-frame is not the third type of sub-frame, identifies at least one symbol which contains a corresponding reference signal within the current sub-frame wherein the at least one initial channel response estimate from among the filtered available reference signals is used to generate the second channel response estimate; and wherein a particular type of sub-frame differs from another type of sub-frame based on at least one of: (a) transmission schedule of reference signals; and (b) arrangement and position of reference signals within the resource grid.

20. The wireless communication device of claim 15, wherein the coefficient set selection module:
- retrieves information from a stored data structure of pre-computed filter coefficients for a fixed length finite impulse response (FIR) filter, wherein the stored data structure comprises multiple stored sets of coefficients for each of a plurality of arrangements of possible reference signal symbol positions and availability in the resource grid; and wherein the multiple stored sets of coefficients are pre-optimized for various channel conditions and latency requirements;
- selects filter coefficients based on: (a) channel conditions, (b) an availability and position of symbols that contain reference signals, and (c) the latency requirement of the physical channel having resource elements for which channel estimates are being calculated, wherein filter coefficients for unavailable and invalid positions are pre-set to zero; and
- wherein the coefficient set selection module identifies a corresponding set of pre-optimized filter coefficients by identifying channel conditions corresponding to received information signals from measurements of at least one of: (a) a corresponding Doppler frequency shift; and (b) a corresponding signal-to-noise (SNR) ratio.

* * * * *